US012565080B2

(12) United States Patent
Zhu

(10) Patent No.: US 12,565,080 B2
(45) Date of Patent: Mar. 3, 2026

(54) RECREATIONAL VEHICLE VENT TOP COVER STILL CAPABLE OF VENTILATION IN CLOSED STATE OF TOP COVER

(71) Applicant: HANGZHOU KAIRUIFAN IMPORT & EXPORT TRADING CO. LTD, Zhejiang (CN)

(72) Inventor: Wenyao Zhu, Hangzhou (CN)

( * ) Notice: Subject to any disclaimer, the term of this patent is extended or adjusted under 35 U.S.C. 154(b) by 94 days.

(21) Appl. No.: 18/439,844

(22) Filed: Feb. 13, 2024

(65) Prior Publication Data

US 2024/0181845 A1 Jun. 6, 2024

Related U.S. Application Data

(63) Continuation-in-part of application No. 17/548,256, filed on Dec. 10, 2021, now Pat. No. 11,926,193.

(51) Int. Cl.
B60H 1/26 (2006.01)
B60H 1/24 (2006.01)

(52) U.S. Cl.
CPC ............. B60H 1/262 (2013.01); B60H 1/245 (2013.01)

(58) Field of Classification Search
CPC .... B60H 1/262; B60H 1/245; B60H 1/00364; B60J 7/1642
See application file for complete search history.

(56) References Cited

U.S. PATENT DOCUMENTS

| | | | |
|---|---|---|---|
| 4,448,112 A | 5/1984 | Soderberg | |
| 4,615,263 A | 10/1986 | Titterud | |
| 6,106,385 A | 8/2000 | Humphrey et al. | |
| 2008/0302019 A1 * | 12/2008 | Milks | B60J 7/1642 49/375 |
| 2015/0140916 A1 * | 5/2015 | Bickel | B60H 1/262 454/145 |

FOREIGN PATENT DOCUMENTS

| | | | |
|---|---|---|---|
| DE | 10200164 C1 * | 3/2003 | ............. B60H 1/262 |
| KR | 960007529 | 3/1996 | |

OTHER PUBLICATIONS

Translation, DE-10200164-C1 (Year: 2003).*

* cited by examiner

*Primary Examiner* — Jessica Yuen

(57) ABSTRACT

A vehicle vent top cover capable of ventilation in a closed position. The top cover includes a top plate having side protection plates extending therefrom. The side protection plates have terminal edges that are offset from the top plate. A duct is contained within the top cover. The duct has an inlet for receiving air from within a vehicle to which it is attached and an outlet that is located between the terminal edges of the terminal edges of the side protection plates and the top plate.

13 Claims, 11 Drawing Sheets

RECREATIONAL VEHICLE VENT TOP COVER STILL CAPABLE OF VENTILATION IN CLOSED STATE OF TOP COVER

CROSS REFERENCE TO RELATED APPLICATIONS

This application is a continuation-in-part of and claims the benefit of priority from the prior U.S. patent application Ser. No. 17/548,256, filed on Dec. 10, 2021, the entire contents of which are incorporated herein by reference.

BACKGROUND OF THE INVENTION

Recreational vehicles are mobile living spaces with all of the amenities necessary for a home away from home. Recreational vehicles integrate space that has room for clothing, food, housing and transportation. Recreational vehicles ("RVs") are generally equipped with a vent for ventilation. A vent in the roof is done because hot air rises. In some instances, the roof vent may be a powered vent that includes a fan, and in other cases the roof vent may simply have an opening that will allow ventilation through natural convection. Windows in the RV will assist in allowing air to travel through the RV and out of the roof.

As a necessity of placement, the roof vent of an RV needs a top cover to prevent rain and other debris from pouring into the RV. The ordinary top cover cannot be opened during rainy days, because that would allow rain to pour through the vent. Rainy days are a particular time when venting an RV may be most important due to high humidity that will cause stuffiness in the living space of the RV. Currently, available roof vents do not allow effective ventilation on rainy days. As such, there is an unmet need for being able to vent an RV during rain.

SUMMARY OF THE INVENTION

The present disclosure describes a vehicle vent top cover that can allow ventilation in its closed position.

The vehicle vent top cover has a top plate and the top plate includes side protection plates that extend from the top plate. The side protection plates have terminal edges that are offset from the top plate. A duct is contained within the vent top cover and the duct has an air inlet for receiving air from within a vehicle to which the vent top cover may be attached. An outlet is spaced from the inlet and is adjacent to one of the side protection plates. The outlet is located between the terminal edges of the side protection plates and the top plate.

In some cases, the duct has a lower sidewall that is offset from the top plate and the lower sidewall is located between the terminal edges of the side protection plates and the top plate. A seal may be mated to the lower sidewall in an area that is designed for that purpose. When the seal is mated to the lower sidewall, it separates the inlet from the outlet.

DESCRIPTION OF THE PREFERRED EMBODIMENT

Figure 1:
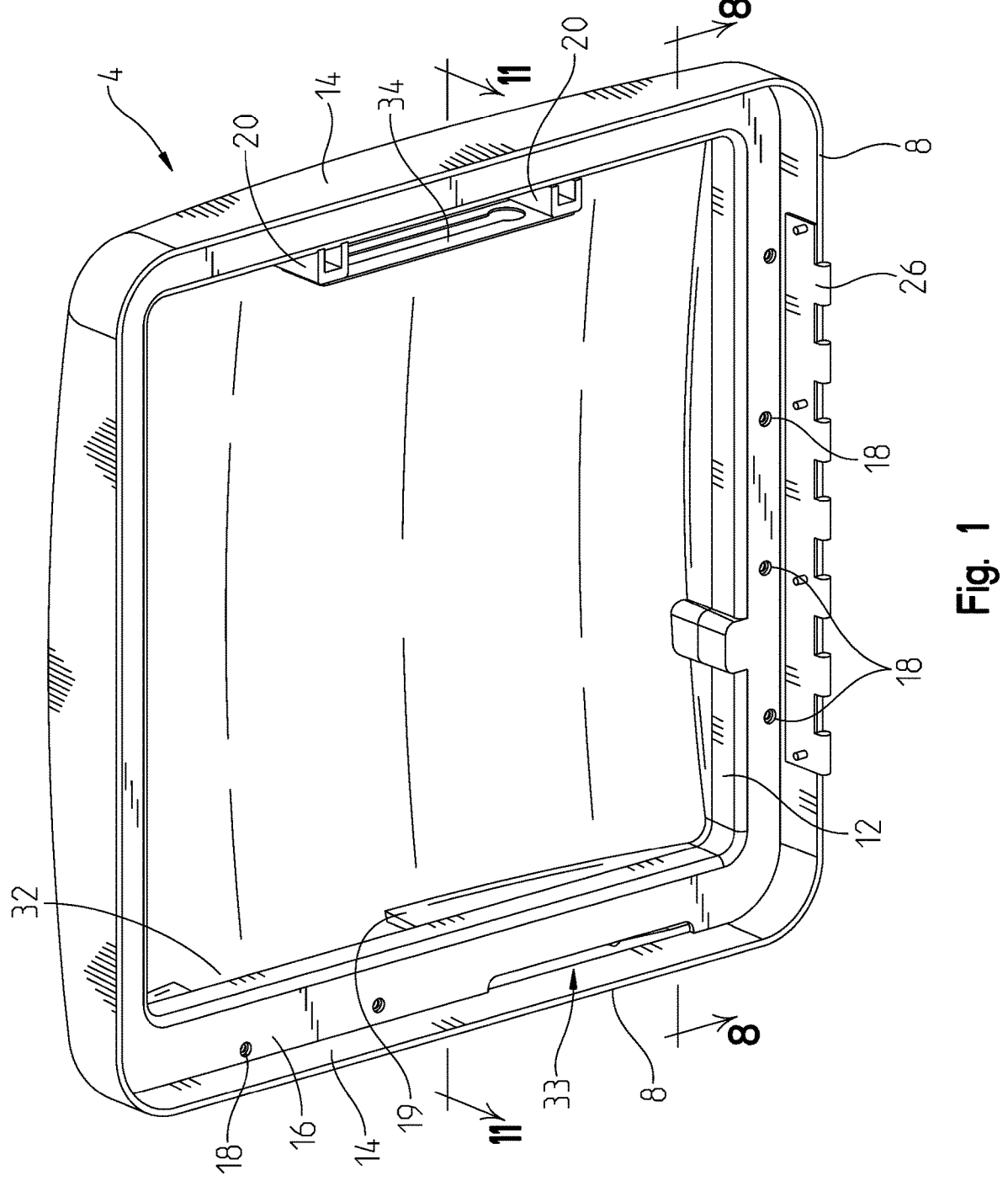
FIG. 1 is a perspective view showing the underside of the vent cover.
Figure 2:
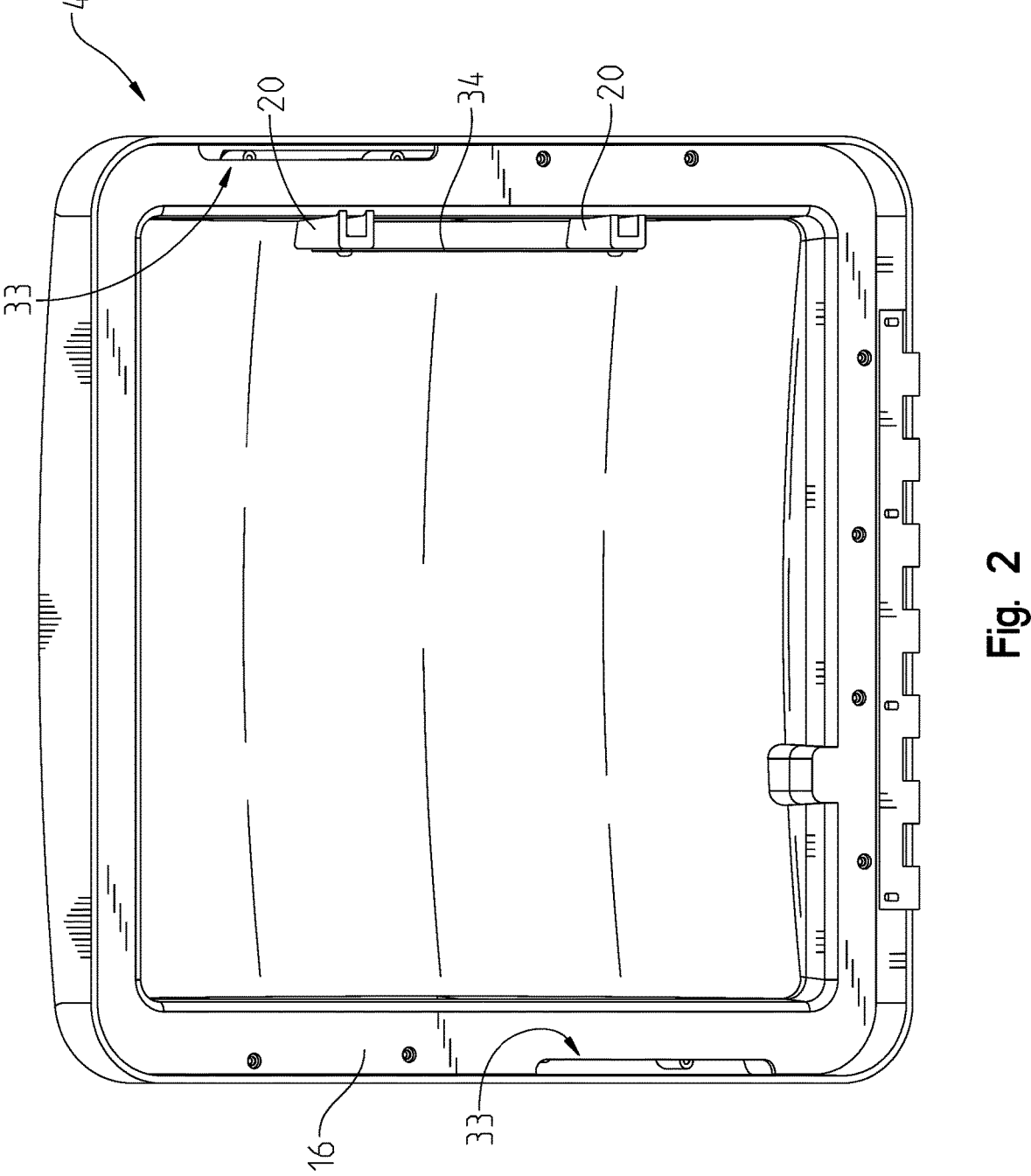
FIG. 2 is another perspective view of the vent cover shown in FIG. 1 showing the underside of the vent cover from a different angle.
Figure 3:
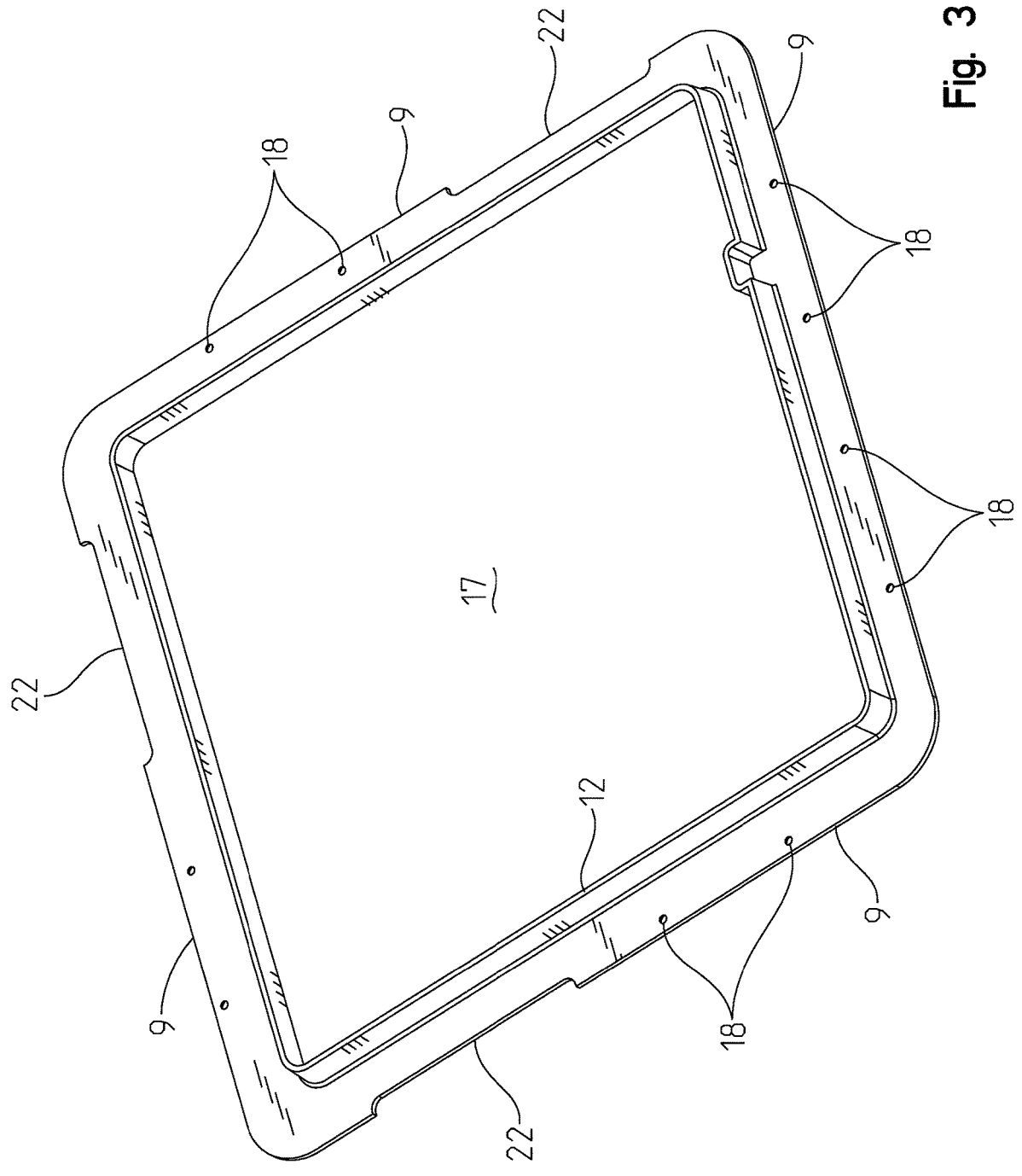
FIG. 3 is a perspective view of the panel forming part of the duct in the vent cover shown in FIGS. 1 and 2.
Figure 4:
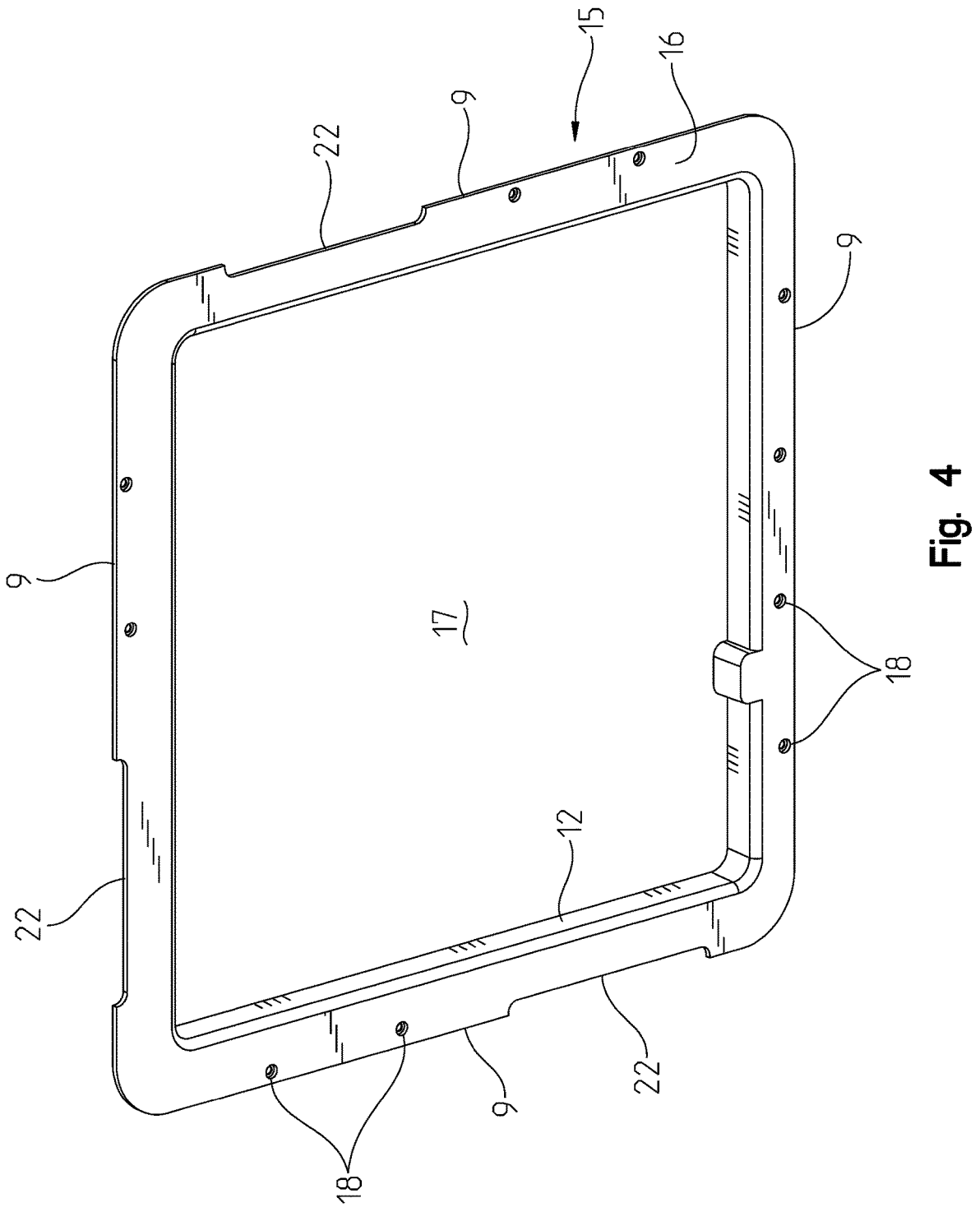
FIG. 4 is another perspective view of the panel shown in FIG. 3 showing the underside of the panel.
Figure 5:
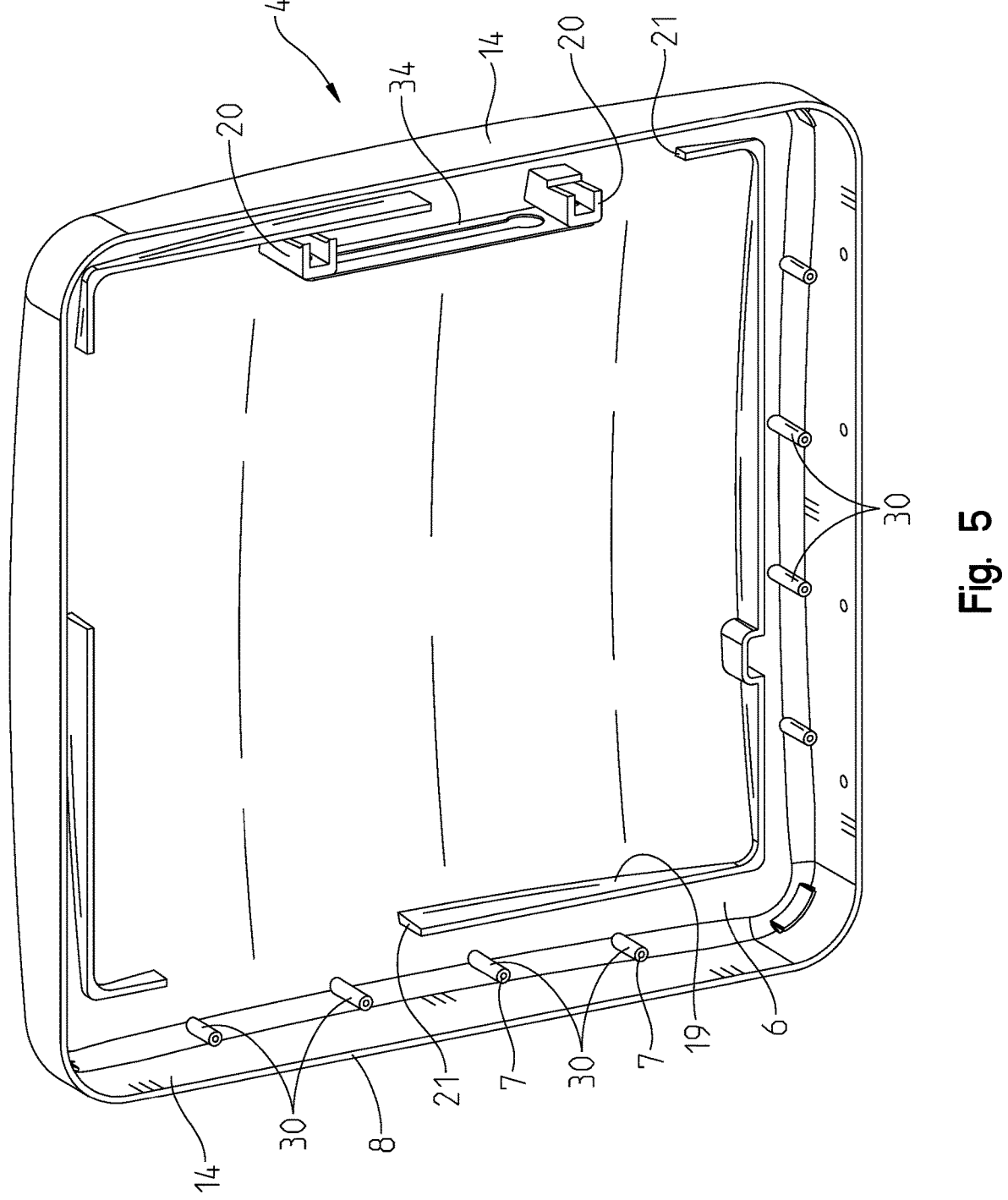
FIG. 5 is a perspective view of the vent cover shown in FIGS. 1-3 with the panel removed.

Examples of the solution provided by the present invention will be clearly and fully described below.

In the description of the present invention, it should be noted that the terms "center," "longitudinal," "horizontal," "length," "width," "thickness," "upper," "lower," "front," "rear," "left," "right," "vertical," "horizontal," "top," "bottom," "inside," "outside," "clockwise," "counterclockwise," and the like, indicating the orientation or positional relationship are based on the orientation or positional relationship shown in the drawings, and are only used for convenience in describing the present invention and simplifying the description, rather than indicating or implying that specific devices or elements must have a specific orientation and be constructed and operated in a specific orientation. Therefore, the terms cannot be understood as limitations to the present invention.

In addition, terms "first" and "second" are only for the purpose of description, and cannot be understood as indicating or implying relative importance or implicitly indicating the number of indicated technical features. Therefore, features defined with "first" and "second" may explicitly or implicitly include one or more of the features. In the description of the present invention, "a plurality of" means two or more, unless otherwise specified. Furthermore, the terms "installed," "connected," and "connection" should be understood in a broad sense, for example, it can be a fixed connection, a detachable connection, or an integral connection; it can be a mechanical connection or an electrical connection; and it can be a direct connection or an indirect connection through an intermediate medium, and can be internal communication of two elements. For those ordinary skilled in the art, the specific meaning of the above terms in the present invention may be understood in specific circumstances.

The vehicle vent top cover 4 of the present invention includes a top plate 13 and side protection plates 14 that are integrally formed on the periphery of the top plate 13. The side protection plates 14 have terminal edges 8 that is offset from the top plate 13. The terminal edges 8 may be considered lower than the top plate 13 when the vent top cover 4 is in what is considered to be its closed position, as will be discussed below. The top plate 13 of the vent top cover 4 is a domed structure that slopes from higher in the center in a generally downwardly direction toward the side protection plates 14. In other words, an upper surface 5 of the top plate 13 is an arc structure. The side protection plates 14 and the top plate 13 are slightly off from perpendicular to each other where they meet and form a certain inclination angle. An inner surface 6 of the top plate 13 includes screw bosses 30 that stand upright from the inner surface 6 of the top plate 13 and terminate in an offset end 7. The screw bosses 30 are for receiving screws (not shown) that are driven into them.

An air duct structural frame 15 includes a panel 16 with a hollow window 17. The panel 16 is located above the terminal edges 8 of the side protection plates 14 (the bottom of the panel 16 is higher than the terminal edges 8 of the side protection plates 14), and the lateral edges 9 of the panel 16 is attached to the inner sides of the side protection plates 14. In other words, the panel 16 is located between the terminal edges 8 of the side protection plates 14 and the top plate 13. A connecting rim 12 is integrally formed on the panel 16 along the outer edge of the hollow window 17 within panel 16, and the connecting rim 12 is perpendicular to the panel 16. The screw bosses 30 are arranged adjacent to the side protection plates 14 and their offset ends 7 serve as an offset to space the panel 16 from the top plate 13. That spacing leaves a space between the panel 16 and the inner surface 6 of the top plate 13. Screws are driven through screw holes 18 in the panel 16 to make the connection between the air duct structural frame 15 and the top plate 13.

Fixed rim 19 is integrally formed on the top plate 13, and the fixed rim 19 is located at inwardly offset from the side protection plates 14. The fixed rim 19 is located to align with the connecting rim 12 when the panel 16 is connected to the top plate 13. The top plate 13 is provided with a metal sliding strip 34 connected with a metal push rod 35 with a gear, and the metal sliding strip 34 is fixed on a fixed buckle 20 at the inner side of the top plate 13.

The fixed rim 19 is provided with a plurality of first ventilation grooves 21. The first ventilation grooves 21 and the upper surface of the connecting rim 12 form air inlets 32. The lateral edges 9 of the panel 16 are provided with a second ventilation grooves 22. The second ventilation grooves 22 and the protection plates 2 form an air outlet 33 when the panel 16 is installed on the top plate 13. The second ventilation grooves 22 and the first ventilation grooves 21 are staggered to each other.

The number of the second ventilation grooves 22 of the present apparatus is not limited to one and may be two or more. When the number of the second ventilation grooves 22 is two, the two second ventilation grooves 22 can be arranged on two opposite lateral edges 9 of the air duct structural frame 15. The number of the second ventilation grooves 22 may be three or four; when the number of the second ventilation grooves 22 is four, four lateral edges 9 of the air duct structural frame 15 are respectively provided with the two second ventilation grooves 22. It should be understood that the number of the second ventilation grooves 22 arranged on the side walls of the air duct structural frame 15 where the second ventilation grooves 22 are arranged is not necessarily limited to one, but can be two or more.

Figure 6:
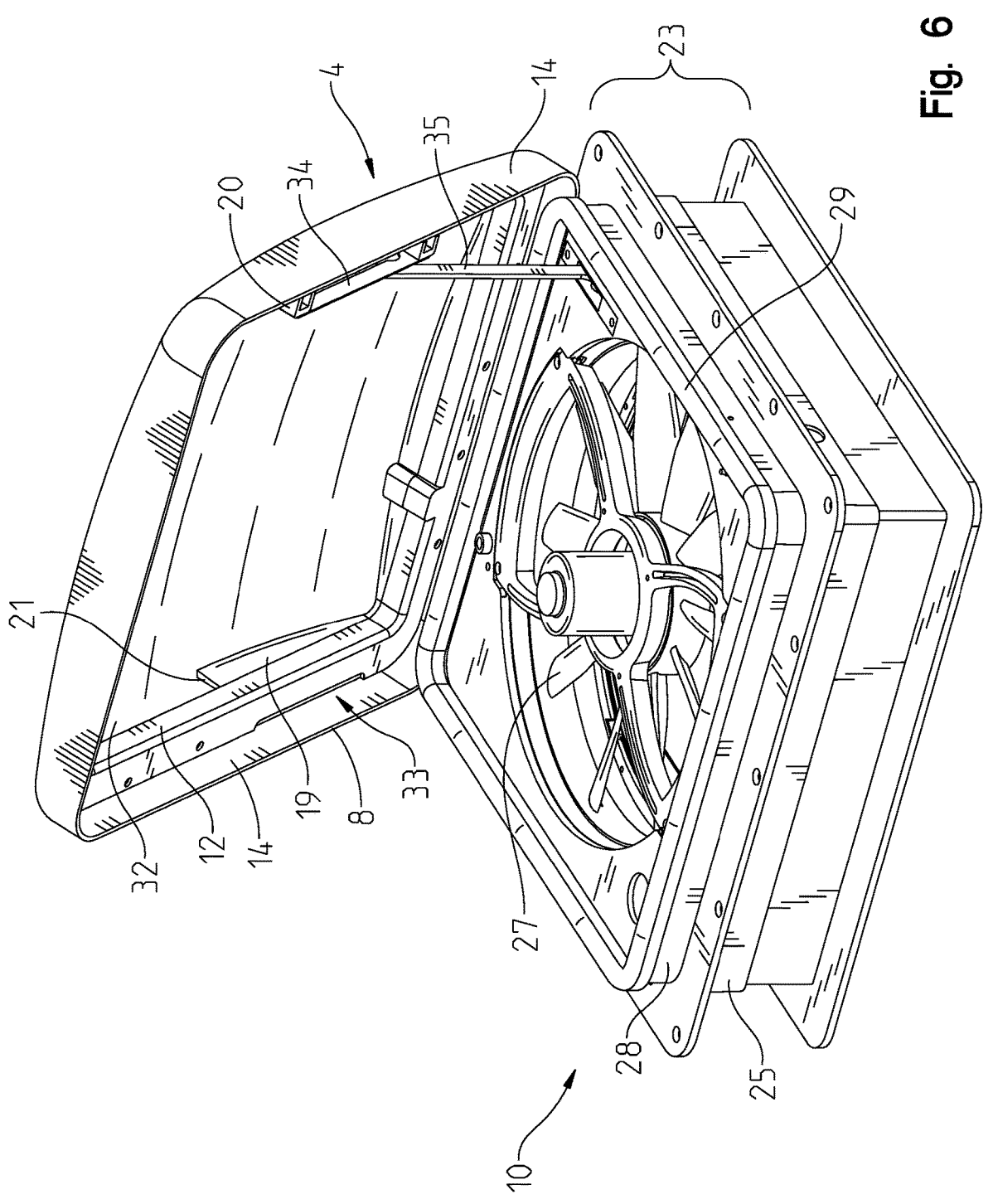
FIG. 6 is a perspective view of an assembly of the vent cover shown in FIGS. 1-3 and a ventilation body.
Figure 7:
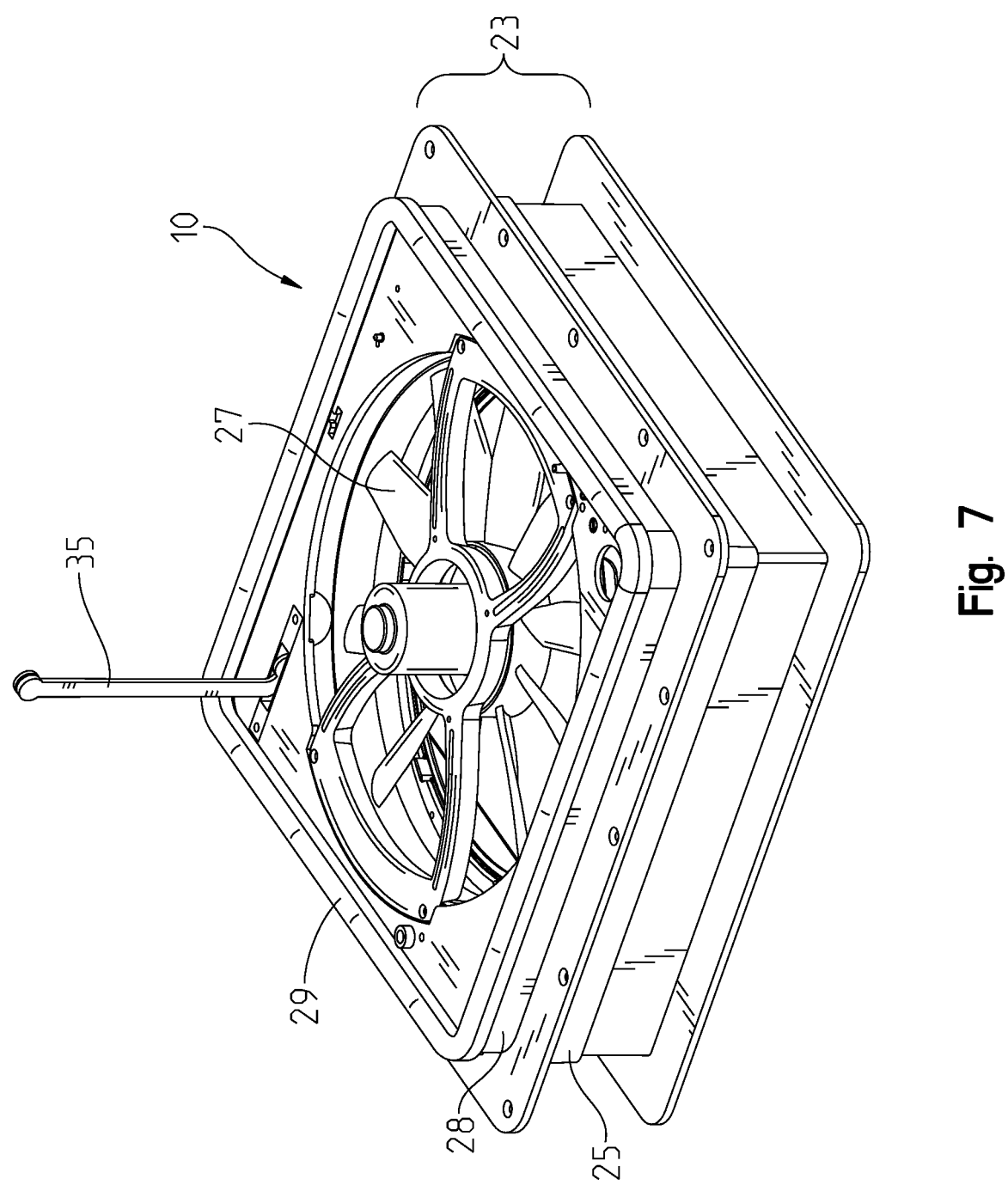
FIG. 7 is a perspective view of just the ventilation body without the vent cover.
Figure 8:
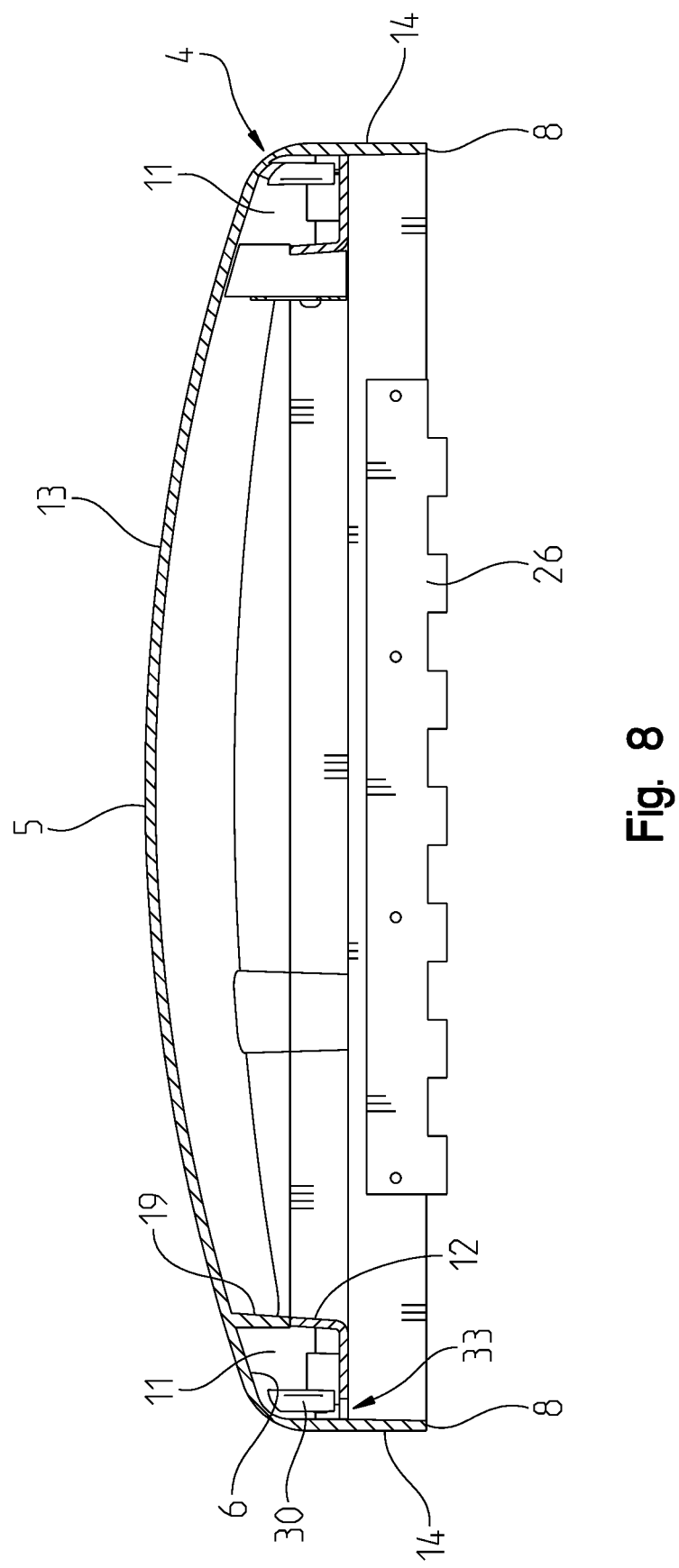
FIG. 8 is a sectional view of the vent cover taken about line 8-8 in FIG. 1 with a portion of the hinge installed.
Figure 9:
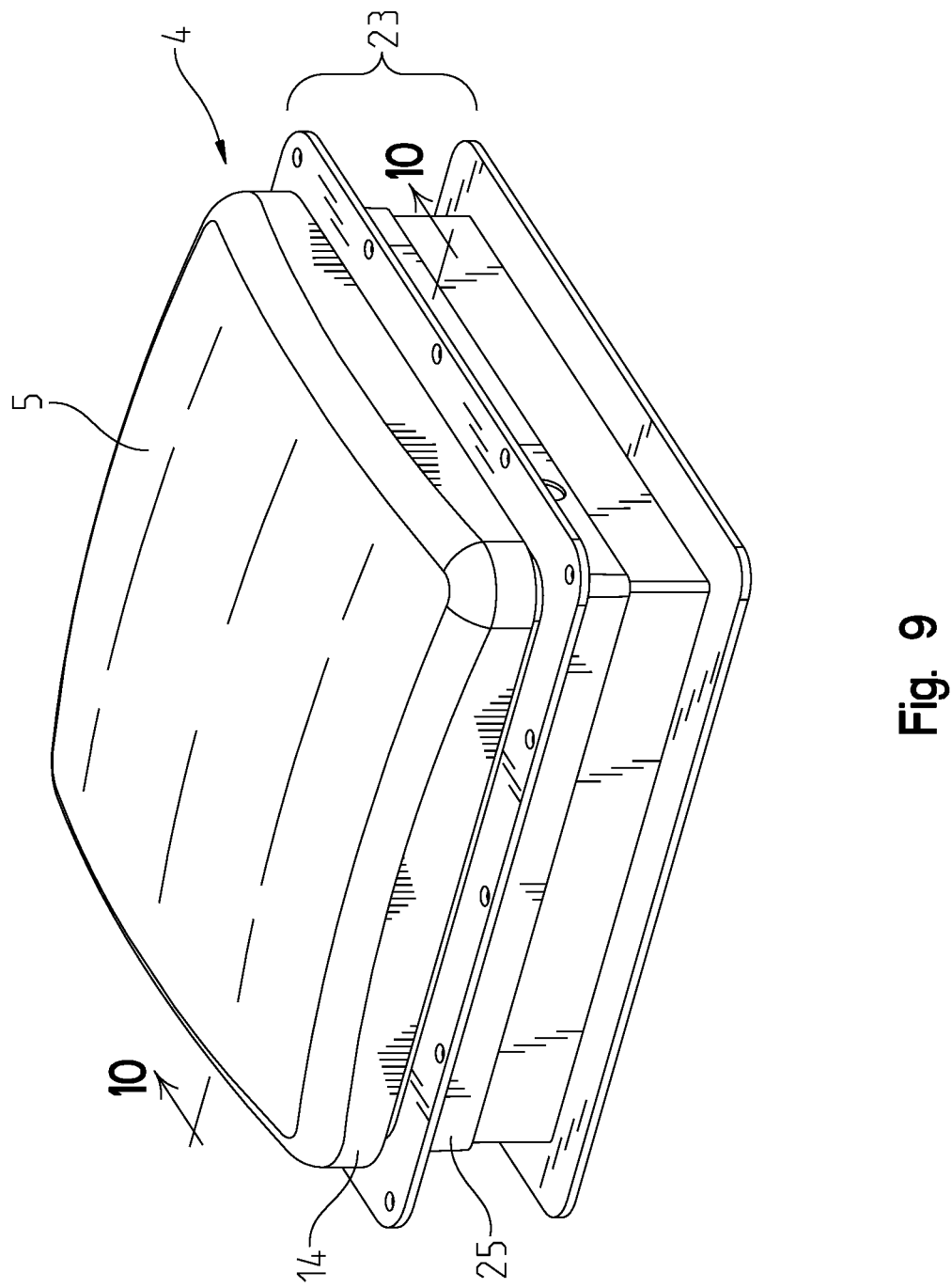
FIG. 9 is a perspective view of the vent cover assembled on a ventilator body.
Figure 10:
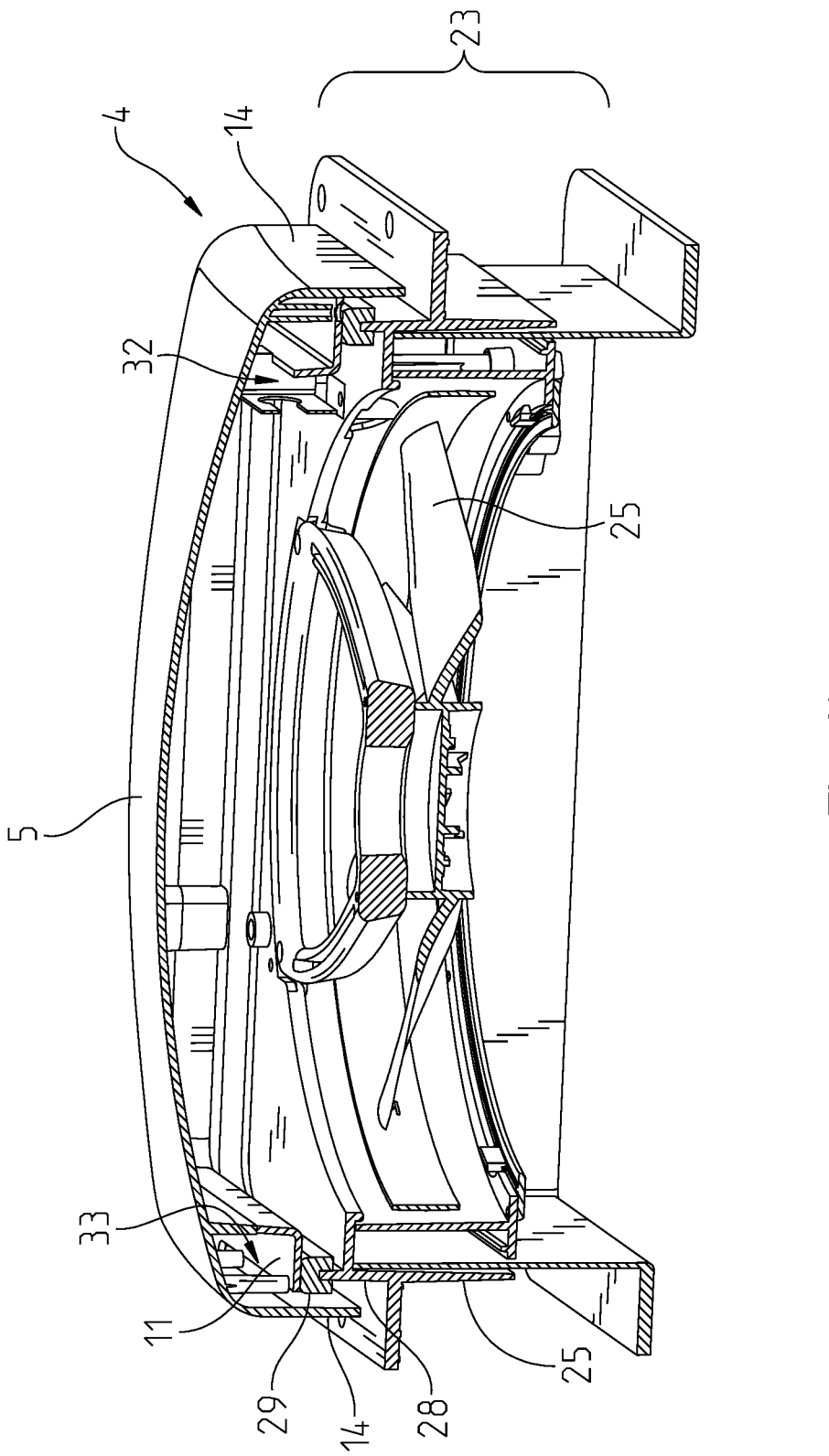
FIG. 10 is a sectional view of the vent cover assembled on ventilator body taken about the line 9-9 in FIG. 9.
Figure 11:
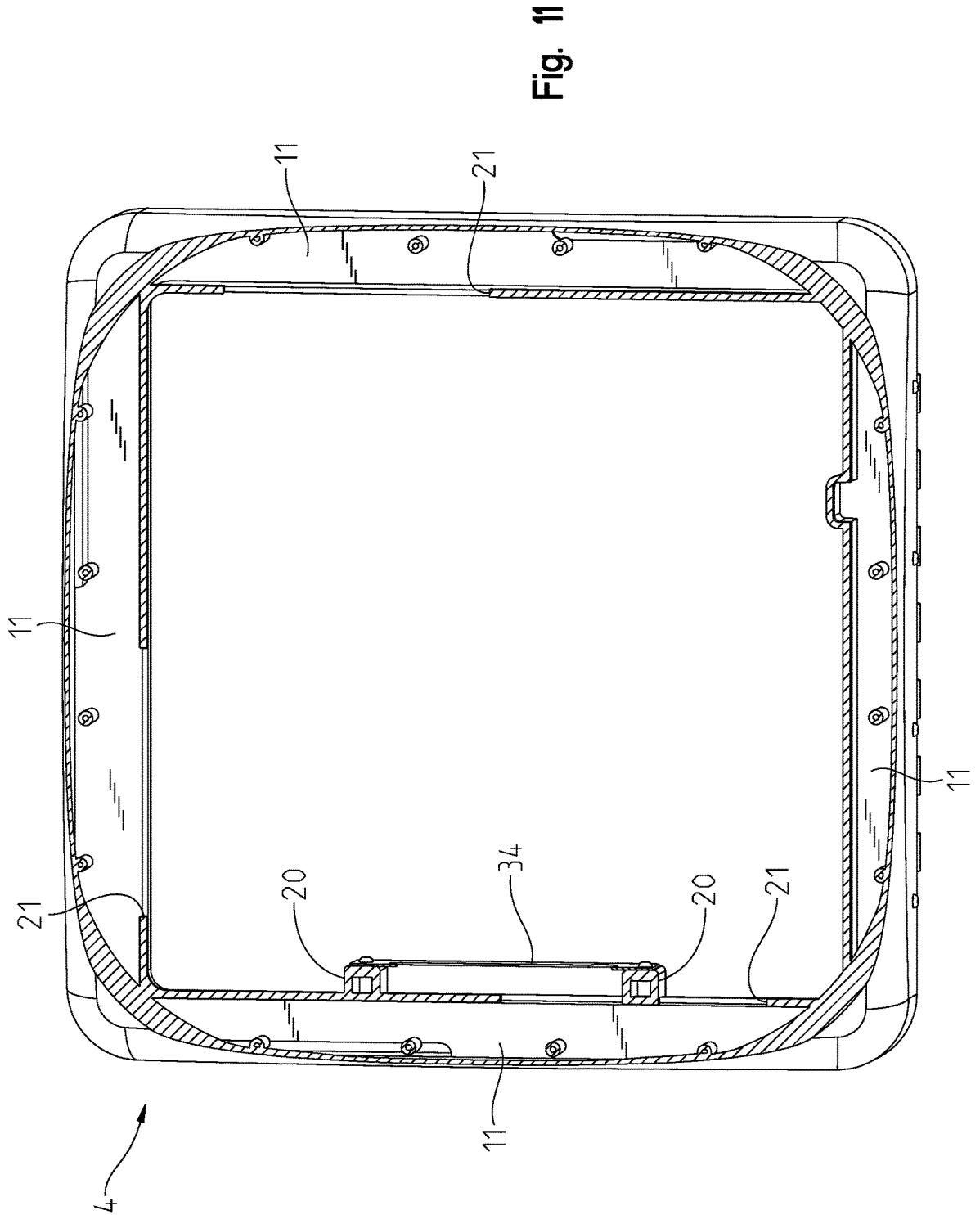
FIG. 11 is a sectional view of the vent cover taken about line 11-11 in FIG. 1.

As shown in FIG. 6, the invention can provide a combination of a vent top cover 4 and a vent 10. The vent 10 includes the vent top cover 4 still capable of ventilation in the closed position of the vent top cover 4, and includes a ventilator body 23 that is used with the vent top cover 4. The vent top cover 4 is hinged with the ventilator body 23 through a hinge 26. One end of a metal push rod 35 is actuated with an actuator in the ventilator body 23 and the other end is slidably connected with a metal sliding strip 34 within the vent top cover 4. The ventilator body 23 includes a frame body 25, and a fan 27 is installed in the frame body 25. The frame body 25 is provided with a rim 28 surrounding the fan 27. The rim 28 serves as a dividing wall between the interior air of the RV and the outside air. As is known generally in the art of vents, the frame body 25 is a hollow structure that provides a path for air to be channeled therethrough. The rim 28 is provided with a sealing rubber strip 29. The vent top cover 4 is rotatable downward to its closed position shown in FIGS. 9 and 10 until the top panel 16 on structural frame 3 compresses the sealing rubber strip 29 tightly on the rim 28, and the compression between the air duct structural frame 15 and the sealing rubber strip 29 creates a seal that is located between the lateral edges 9 of the panel 16 and the connecting rim 12. As can be see in FIG. 8, the air duct structural frame 15 cooperates with the vent top cover 4 to form a duct 11 that surrounds the hollow window 17. The duct 11 that is formed between the vent top cover 4 and the panel 16 has lateral walls formed by the cooperation of connected parts. A first lateral wall of the duct 11 is formed by the side protection plates 14 and a second sidewall opposite to the first sidewall of the duct 11 is formed by the cooperation of the connecting rim 12 and the fixed rim 19. The second sidewall is an inner sidewall that surrounds the hollow window 17 that extends upwardly toward the top plate 13 of the vent top cover 4. An upper sidewall of the duct 11 is formed by the vent top cover 4 and a lower sidewall of the duct 11 is formed by the panel 16 on the structural frame 3. The fixed rim 19 and connecting rim 12 each form approximately half of the second sidewall that is inner portion of the duct 11 that faces the hollow window 17. It is contemplated that the fixed rim 19 on the vent top cover 4 could be extended down to a flat panel approximating the shape of panel 16. Additionally, it is contemplated that other hollow channels or combinations of parts that form a duct like 11 could be possible. The important feature of the duct 11 is that it has an air outlet 33 that is outside of where the rubber strip 29 forms a seal against the lower sidewall of the duct 11, and an air inlet 32 on the inside of the rubber strip 29. The air inlets 32 are on opposite sides of duct 11 with respect to the air outlets 33. This locates the air inlet 32 and air outlet 33 on opposite sides of the rim 28 and on opposite sides of the rubber strip 29 that seals against the panel 16 forming the lower sidewall of the duct 11. The lower sidewall of the duct 11 that corresponds to panel 16 has an area the separates the air inlets 32 from the air outlets 33 so that sealing via the rubber strip 29 can occur between the air inlets 32 and the air outlets 33. All that is necessary for the duct 11 is that it provide fluid communication between the air inlets 32 and the air outlets 33 that are on opposite sides of the rim 28 and rubber strip 29 attached thereto. The duct 11 providing fluid communication between the air inlets 32 and the air outlets 33 allows air to pass from the hollow window 17 via the air inlets 32 and the out of the air outlets 33 just outside of the rim 28 that supports the seal from the rubber strip 29. Having the air inlets 32 on one side of the duct 11 and the air outlets 33 on the other side of the duct 11 allows the vent top cover 4 to be closed, yet still provide the passage of air out of the vent top cover 4. The lower sidewall of the duct 11 (corresponding to panel 16) provides a substantial flat surface upon which the rubber strip 29 may compressed to make the seal against the lower sidewall and thereby separate the air inlets 32 from the air outlets 33 and force air to travel through the duct 11 when the vent top cover 4 is in its closed position. The flow path through the duct 11 is shown in FIG. 10. Additionally, the air inlets 32 are located nearer the top plate 13 than the air outlets 33 which prevents any travel of water upward from the air inlets 32 to the air outlets 33 when the vent top cover 4 is in its closed position. The configuration of the present invention allows a path for air through the inside of the rim 28 to outside of the rim 28 and to ambient air outside of an RV in which the vent 10 is installed.

According to the present invention, the vent top cover 4 and the ventilation fan 27 form a complete ventilation system, and the air duct structural frame 15 arranged in the vent top cover 4 presses the sealing rubber strip 29, thereby achieving an effect for preventing rainwater or dust from entering the vehicle when the vent top cover 4 is closed. The second ventilation grooves 22 are arranged on the air duct structural frame 15 and the first ventilation groove 21 is arranged on the top plate 13, so that when the ventilation fan 27 is started, air passes through the air inlets 32 and the air outlets 33 in sequence. When the vent top cover 4 is closed, the opening of the air outlets 33 formed by the second ventilation grooves 22 face downward and are located offset from the terminal edges 8 of the side protection plates 14. When the vent top cover 4 is in its closed position, rainwater cannot enter the vehicle. The lateral edges 9 located on panel 16 of the air duct structural frame 15 are held in contact the side protection plates 14 of the vent top cover 4 for blocking water from traveling upward into the air outlets 33, thereby preventing the rainwater from entering the vehicle.

The vent top cover 4 of the present invention can also play a role of partial air convection when installed on an unpowered fan or a skylight. This can improve the air quality in the vehicle even in cases where a fan 27 is not provided or the fan 27 is turned off. By arranging the vent top cover 4 and the air duct structural frame 15, an effect for preventing the rainwater from entering the vehicle can be well ensured. The second ventilation grooves 22 arranged on the air duct structural frame 15 and the first ventilation grooves 21 arranged on the top plate 13 form the air outlet 33 and the air inlet 32 respectively, so that the ventilation of the vehicle in rainy days can be realized; the air outlet 33 and the air inlet 32 are staggered to each other (as shown in FIG. 6) and the bottom edge of the panel 16 is higher than the terminal edges 8 of the side protection plates 14 when the vent top cover 4 is closed, so that the rainwater can be prevented from entering the vehicle; and the air quality in the vehicle can be ensured, the vent top cover 4 can be opened for light transmission and ventilation when there is no rain, so that the problem that the ventilation in the vehicle cannot be realized in the rainy days can be solved, and the air quality and comfort in the vehicle can be improved.

By using the vehicle vent top cover 4 still capable of ventilation in the closed state of the vent top cover 4 provided by the present invention, when in rainy days, the vent top cover 4 is closed; when the fan 27 exhausts air outwards, part of air may enter the air duct 11 through the air inlet 32 and is then discharged from the air outlet 33, thereby forming a ventilation process. When the vent top cover 4 is closed, the air duct structural frame 15 and the rubber strip 29 installed on the rim 28 squeeze each other to achieve the sealing and rainproof effect, and the air outlet 33 and the air inlet 32 are located at two sides of the air duct 11 respectively, so that the sealing effect may not be affected, thereby achieving an effect for preventing the rainwater from entering the vehicle. The opening of the air outlet 33 that is used for exhaustion faces downward and is located inside the side protection plates, so that rain and snow cannot enter the vehicle. The ventilation purpose of the vehicle in rainy days and snowy days can be realized.

The present invention provides the vehicle vent top cover 4 capable of ventilation in the closed state, which can be used especially when the vent top cover 4 cannot be opened for ventilation in rainy days. The vehicle vent top cover 4 includes the vent top cover 4 and the air duct structural frame 15; and the vent top cover 4 includes the top plate 13, a connecting fixed rim 19 and side protection plates 14 below the top plate 13, and screw bosses 30. The connecting fixed rim 19 is provided with the first ventilation groove 21 which forms an air inlet 32 when the fixed rim 19 is fixed with the air duct structural frame 15. The air duct structural frame 15 is located above the terminal edges 8 of the side protection plates 14 and provided with the screw holes 18 and is fixed by screws and the screw bosses 30 on the vent top cover 4. The other side of the air duct structural frame 15 is provided with the second ventilation groove 22 which forms an air outlet with 33 the side protection plate 14 of the vent top cover 4 when the air duct structural frame 15 is fixed. According to the present invention, when the vent top cover 4 is closed, the air duct structural frame 15 and rubber strip 29 on a ventilator body 23 squeeze each other to achieve a sealing and rainproof effect. The opening of the air outlet 33 faces downward and is located inside the side protection plates 14, so that rain and snow cannot enter the vehicle; and in case of extreme weather, rainwater enters an air duct 11 through the air outlet 33, the rainwater may be blocked by the other side of the air duct structural frame 15, and the air outlet 33 and the air inlet 32 are staggered to each other. Therefore, the ventilation of the vehicle in rainy days and snowy days can be realized, and the vent top cover 4 can be opened for ventilation when there is no rain.

It is understood that while certain aspects of the disclosed subject matter have been shown and described, the invention may be modified within the scope of the following claims.

What is claimed is:

1. A vehicle vent top cover comprising:
   a top cover having a top plate, said top plate including side protection plates extending from said top plate and said side protection plates having terminal edges that are offset from said top plate;
   a duct contained within said top cover, said duct having an inlet for receiving air and an outlet spaced from said inlet being adjacent to one of said side protection plates, said outlet being located between said terminal edges of said side protection plates and said top plate, wherein said duct includes a lower sidewall that is offset from said top plate and said lower sidewall being located between said top plate and said terminal edges of said side protection plates, said lower sidewall of said duct having an area for accommodating a seal that may be mated thereto, wherein said seal separates said inlet from said outlet when said seal is mated to said lower sidewall of said duct.

2. The vehicle vent top cover of claim 1, wherein said duct includes a lower sidewall that is offset from said top plate and said lower sidewall being located between said top plate and said terminal edges of said side protection plates, said lower sidewall of said duct having an area for accommodating a seal that may be mated thereto, wherein when said seal separates said inlet from said outlet when said seal is mated to said lower sidewall of said duct, said lower sidewall being a panel that is affixed to and offset from said top plate and said panel surrounding an inner sidewall of said duct extending between said panel and said top plate, said inner sidewall including said inlet.

3. The vehicle vent top cover of claim 2, wherein said inlet is nearer said top plate than said outlet.

4. The vehicle vent top cover of claim 1, wherein said vent top including a panel offset from said top plate, said panel including lateral edges that are held adjacent to said side protection plates, said panel cooperating with said top plate to form said duct, said panel including a ventilation groove extending into said panel, said ventilation groove and said side protection plate cooperating to form an outlet of said duct, said duct including an inlet spaced inwardly from said outlet so that air entering said inlet may travel across said duct from said inlet to said outlet.

5. The vehicle vent top cover of claim 4, wherein said panel and said top plate cooperate to form an inner sidewall of said duct, said inner sidewall including said inlet.

6. The vehicle vent top cover of claim 5, wherein panel includes an area located between said inlet and said outlet for contacting a seal.

7. A vehicle vent top cover for use in combination with a ventilator body comprising:

a top cover having a top plate, said top plate including side protection plates extending from said top plate and said side protection plates having terminal edges that are offset from said top plate;

a duct contained within said top cover, said duct having an inlet for receiving air from within said vehicle and an outlet spaced from said inlet, said outlet being located between said terminal edges of said side protection plates and said top plate, said duct having a surface for contacting a seal surrounding said ventilator body, said seal contacting said duct between said inlet and said outlet when said vehicle vent top cover is in a closed position thereby allowing air to pass from said inlet to said outlet when said seal is contacting said duct.

8. The vehicle vent top cover of claim 7, wherein said duct includes a lower sidewall that is offset from said to plate and said lower sidewall being located between said top plate and said terminal edges of said side protection plates, said lower sidewall including said surface for contacting said seal wherein said seal separates said inlet from said outlet when said seal is mated to said lower sidewall of said duct.

9. The vehicle vent top cover of claim 8, wherein said air inlet is nearer said top plate than said outlet.

10. The vehicle vent top cover of claim 7, wherein said duct includes a lower sidewall that is offset from said top plate and said lower sidewall being located between said top plate and said terminal edges of said side protection plates, said lower sidewall of said duct having an area for accommodating said seal that may be mated thereto, wherein when said seal separates said inlet from said outlet when said seal is mated to said lower sidewall of said duct, said lower sidewall being a panel that is affixed to and offset from said top plate and said panel surrounding an inner sidewall of said duct extending between said panel and said top plate, said inner sidewall including said inlet.

11. The vehicle vent top cover of claim 7, wherein said vent top including a panel offset from said top plate, said panel including lateral edges that are held adjacent to said side protection plates, said panel cooperating with said top plate to form said duct, said panel including a ventilation groove extending into said panel, said ventilation groove and said side protection plate cooperating to form an outlet of said duct, said duct including an inlet spaced inwardly from said outlet so that air entering said inlet may travel across said duct from said inlet to said outlet.

12. A vehicle vent top cover comprising;

a top cover having a top plate, said top plate including side protection plates extending from said top plate and said side protection plates having terminal edges that are offset from said top plate, said top cover being pivotable into a closed position with respect to a seal located adjacent to said top cover, said closed position putting said seal in contact with said top cover;

a duct contained within said top cover, said duct having a lower sidewall for contacting said seal when said top cover is in said closed position, said lower sidewall being offset from said top plate and located between said terminal edges of said side protection plates, said duct including an inlet and an outlet being located on opposite sides of said seal and allowing air to pass between said inlet and said outlet when said top cover is in said closed position.

13. The vehicle vent top cover of claim 12, wherein said inlet is nearer said top plate than said outlet.

* * * * *